United States Patent Office 3,487,127
Patented Dec. 30, 1969

3,487,127
RUBBER-MODIFIED RESINOUS POLYMERS PREPARED IN THE PRESENCE OF A POLYPHENYLENE OXIDE
Michael Erchak, Jr., Ridgewood, Frederick E. Carrock, Paramus, and Karl F. Koch, Berkeley Heights, N.J., assignors to Dart Industries Inc., Los Angeles, Calif., a corporation of Delaware
No Drawing. Filed Dec. 13, 1965, Ser. No. 524,632
Int. Cl. C08f *19/08, 41/10*
U.S. Cl. 260—876    13 Claims

ABSTRACT OF THE DISCLOSURE

The improvement for preparing a diolefin rubber-modified polymer in a two-step process comprises adding to the prepolymerization product mixture from the first step 2 to 20% of a polyphenylene oxide polymer after a feed mixture of, e.g., styrene and polybutadiene has been heated to 110°–130° C. for a period of time sufficient to polymerize about 10–45% of the styrene, and substantially completing the polymerization in suspension in the second step. The recovered product has unexpected improvement in impact strength, hardness and heat deflection temperature.

---

This invention relates to improved graft polymers and to their method of preparation. More particularly, the invention pertains to impact resistant rubber-modified polymers and interpolymers wherein a vinyl aromatic compound, alone or in admixture with another monomeric compound, is interpolymerized with a natural or synthetic rubber.

There have been previous disclosures directed to impact resistant, rubber-modified vinyl aromatic polymers as well as to a number of processes for preparing the same. One such impact resistant polymer is rubber-modified polystyrene, and the present invention will be described hereinafter primarily in terms of the modification and improvement of impact resistant, rubber-modified polystyrene. It will be understood, however, that other graft interpolymers, such as those wherein the styrene is replaced in whole or in part by other monovinyl aromatic compounds or by other monomeric compounds, such as acrylonitrile are also encompassed by the present invention.

In general, the commercial impact resistant polystyrenes which are presently available are prepared by dissolving a rubber, usually synthetic in nature, in styrene, and then polymerizing the resulting mixture. It has been well established that a portion of the styrene is grafted onto the rubber molecule chains with the remaining styrene polymerizing with itself. As a result, impact resistant, rubber-modified polystyrenes are composed of polystyrene and grafted copolymers of rubber and styrene.

A bulk suspension process can be employed in the preparation of the impact resistant polystyrenes. In such a process the styrene-rubber feed mixture is initially prepolymerized with agitation at a temperature below about 130° C. when thermal initiation is used, the exact temperature level being dependent somewhat upon the type of initiator or initiators employed. In this preliminary step a polymer conversion of less than about 50%, and preferably about 15 to 30%, is attained. The resulting reaction product mixture is then subjected to a second polymerization step wherein the conversion is essentially completed. In most operations the reaction product mixture obtained from the prepolymerization step is transferred from the first polymerization zone or vessel to a separate zone or vessel wherein the desired conversion to completion is carried out.

The second polymerization step can be performed by dispersing the prepolymerization reaction product mixture in an aqueous suspension. Although this second polymerization step need not be carried out in a separate zone or vessel, the transfer technique is preferred. In either event, a two-stage process is involved comprising a prepolymerization step and a second polymerization step for completing conversion to the polymer.

For some commercial purposes it would be highly desirable to obtain such rubber-modified polymers having impact, heat deflection and surface hardness characteristics which are superior to those found in the conventional impact resistant vinyl aromatic polymers described above.

One object of the present invention is to provide improved impact resistant, rubber-modified monovinyl aromatic polymers having superior physical characteristics.

Another object of this invention is to provide impact resistant, rubber-modified polystyrenes having superior physical properties such as impact resistance, heat deflection and surface hardness.

A further object of this invention is to provide a bulk suspension polymerization process for preparing such improved impact resistant, rubber-modified monovinyl aromatic polymers.

A still further object of this invention is to provide a bulk suspension polymerization process for the preparation of improved impact resistant, rubber-modified polystyrenes.

These and other objects of the present invention will become readily apparent from the ensuing description and illustrative embodiments.

In accordance with the present invention, it has now been found that such improved impact resistant monovinyl aromatic polymers can be prepared by completing the polymerization of the vinyl aromatic-rubber feed mixtures in the presence of a polyphenylene oxide polymer. The latter is a recently developed thermoplastic, of high molecular weight, possessing certain outstanding physical properties. Descriptions of the polyphenylene oxide polymers and a process for their preparation are found in "Chemical and Engineering News," pp. 57–58, Dec. 7, 1964; and British Patent No. 930,933. In general, the novel and improved polymers of this invention are prepared by the above described bulk suspension process.

The polyphenylene oxide polymer component of the polymerization mixture comprises recurring units having the following structural formula:

wherein AR is a divalent aryl radical and *n* is an integer from 10 to 1000 or higher. That is, these polymers have molecular weights ranging from about 1,000 to 1,000,000 or higher, preferably 10,000 to 100,000. The divalent aryl radical may be either unsubstituted or substituted and includes such radicals as phenylene, chlorophenylene, naphthalene, tolylene, and the like.

The polyphenylene oxide polymer can also have recurring structural units such as

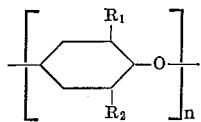

wherein $R_1$ and $R_2$ can be either hydrogen; alkyl radicals having from 1 to 10 carbon atoms such as methyl, ethyl, propyl, isopropyl, butyl, pentyl, etc.; halogens such as chlorine, bromine, etc.; as well as aralkyl, alkaryl and aryl radicals having from 7 to 20 carbon atoms. $R_1$ and $R_2$ may either be the same or different. The integer $n$ will be at least 10 and as high as 5,000 or higher. When $R_1$ and $R_2$ are alkyl groups the polymer composition is a poly-2,6-dialkyl phenylene oxide; and when $R_1$ and $R_2$ are methyl groups the polymer is poly-2,6-dimethyl-1,4-phenylene oxide. When $R_1$ and $R_2$ are methyl and hydrogen for example, then the polymer is poly-2-methyl-1,4-phenylene oxide.

In general, the polyphenylene oxide polymers employed in the process of this invention are obtained by the oxidative coupling of phenolic compounds, such as 2,6-dimethylphenol. The phenols are oxidized by the use of an oxidizing gas such as oxygen, air, etc. in the presence of a copper-amine complex catalyst. The reaction can be carried out in either homogeneous or heterogeneous polymerization systems. It will be understood, however, that the exact method of preparing the polyphenylene oxide polymers does not constitute an essential feature of the present invention.

Although styrene is the preferred monovinyl aromatic or vinyl aryl compound employed in the process of this invention, other related compounds can also be readily utilized as the monomeric feed material. Examples of such compounds include alkyl and/or halogen derivatives of styrene such as alpha-methyl-styrene and nuclear substituted monomers such as methylstyrenes, ethylstyrenes, isopropylstyrenes, butylstyrenes, both mono and dialkyl forms; the chloro- and dichlorostyrenes, mono- and dibromostyrenes; alkyl halostyrenes; as well as mixtures of this compounds with styrene or with each other.

As the rubber component, there can be employed rubbery systems such as butadiene-acrylonitrile; polybutadiene rubbers, whether of the linear or non-linear type (emulsion polymerization of butadiene results in a non-linear polymer); polyisoprene; polycyclopentadiene; natural rubber; chlorinated rubber; copolymers of butadiene with styrene, both linear and non-linear types; copolymers of butadiene with isobutylene; and mixtures thereof. The homopolymers of isoprene can be of the linear or non-linear type. SBR type linear rubbers (solution polymerized with stereo-specific catalysts) can contain from 5 to 50% by weight of styrene to 50 to 95% by weight of butadiene, a specific type containing about 25% styrene and 75% butadiene by weight.

A preferred rubbery material, according to the present invention, is a linear polybutadiene (polymerized primarily by 1,4 addition) having a cis content of about 30 to 98%, preferably 35 to 60%. Butadiene or isoprene polymerized by cis-1,4 addition exists in a rubbery form at ambient temperatures. The cis-1,4 form can be produced either by lithium metal or lithium alkyls or by a Ziegler-type catalyst system, as is well known in the art. These methods of polymerization yield linear polymers in contradistinction to largely non-linear polymers obtained by the well known emulsion polymerization recipes. The preferred cis-polybutadiene which can be employed in the compositions of this invention will have a viscosity between 30 to 90, preferably about 40 to 60, as measured on the Mooney viscometer at 212° F. (ML–4) ASTM D–927–55T.

The water employed in the suspension polymerization step of this invention can be heated to temperatures of about 87° to 94° C. prior to transfer to the polymerization zone. The water will generally contain a suspending agent such as carboxy-methyl cellulose, hydroxyethyl cellulose, polyvinyl alcohol, methyl cellulose, sulfonated polystyrenes, polyglycol ethers, and the like. The use of hydroxyethyl cellulose is especially preferred. The amount of hydroxyethyl cellulose, having a viscosity of 1500–3500 cps. at 25° C. for 1% aqueous solution, used will be broadly from about 0.025 to 1.5% by weight, and preferably from about 0.075 to 0.40 by weight, based on the weight of the water. It will be understood, however, only minor amounts of the suspending agents need be employed, and that the exact amount used is not critical.

As is well known in this field, it is also possible to carry out the bulk suspension process in the presence of minor amounts of antioxidants, chain regulators, lubricants and inert fillers.

The bulk suspension polymerization process of this invention initially involves adding the rubber, e.g., linear polybutadiene rubber having a cis-1,4 content of about 35 to 98%, to the monovinyl aromatic compound, e.g. styrene, in a prepolymerization vessel equipped with a stirrer. The linear polybutadiene rubber is preferably finely ground and is used in an amount ranging from about 2 to 25% by weight, preferably 4 to 15% by weight, based on the total weight of the styrene. If desired, the aforementioned conventional additives can be added in minor amounts to the polymerization reaction mixture.

After the dissolution of the linear polybutadiene in the styrene, polymerization in bulk is commenced with thorough agitation using a peroxide initiator or thermally. The use of thermal initiation is preferred; and, consequently, the polymerization is carried out at a temperature within the range of about 110° to 130° C., and preferably at about 115° to 125° C. The polymerization is continued until from about 10 to 45%, about 15 to 30% in the preferred embodiment, of the styrene is polymerized. In general, the prepolymerization step takes from 2 to 8 hours. A suitable organic peroxide such as dibenzoyl peroxide, dilauroyl peroxide, tertiary butyl peracetate, tertiary butyl perbenzoate, di-tertiary butyl peroxide, cyclohexanone peroxide etc. and mixtures thereof can be used in amounts ranging from 0.02 to 0.2%, preferably 0.05 to 0.125 by weight based on the mixture.

In the prepolymerization step a major proportion of the styrene and all of the rubber components are admixed and reacted to form the so-called "prepolymer." At the conclusion of this step and prior to the suspension step, the polyphenylene oxide polymer is added in the form of a styrene solution. In general, the solution will comprise about 20% polyphenylene oxide polymer and the remainder of the styrene.

Upon completion of the prepolymerization step to the desired conversion and after the addition of the polyphenylene oxide polymer solution and initiators, the resulting mixture is suspended in an aqueous system containing a suspension agent, as described above. The amount of the polyphenylene oxide polymer added will range from about 2 to 20%, and preferably from about 4 to 10%, by weight based on total weight of the polymer product. Additional additives and initiators may also be utilized, and for the present purposes an organic peroxide is preferably added to the prepolymer to substantially complete the polymerization and to aid in shortening the overall polymerization time-temperature cycle. It is also possible to include initially one or two peroxide initiators in the prepolymerization step, such as a low temperature initiator for prepolymerization and a high temperature initiator for the subsequent suspension polymerization step. A suitable initiator which can be effectively used for the suspension polymerization is an organic peroxide such as dibenzoyl peroxide, dicaproyl peroxide, dilauroyl peroxide, tertiary butyl perbenzoate, dicumyl peroxide, tertiary butyl peracetate, ditertiary butyl perbenzoate and mixtures thereof. The use of tertiary butyl perbenzoate for the suspension step is especially preferred. In general, the amount of suspension step initiator will range from about 0.05 to 0.3, preferably from about 0.1 to 0.2%, by weight based on the prepolymer.

The prepolymer and other components are added to the suspension preferably in the vicinity of the agitator blade or vanes of the reaction vessel so as to facilitate the formation and dispersion of the rubber particles and the polymer beads. The prepolymer is added in an amount such that the ratio of prepolymer to water is generally about 1:2 to 3:2, and preferably at a ratio of from 1.5:2 to 2.3:2.

The time-temperature cycle best suited for completion of the present polymerization process after transferring of the bulk prepolymer to the aqueous system is generally from about 60° to 145° C. for a period of about 4 to 10 hours. Excellent results are obtained when the suspension is maintained at a temperature of from 100° to 115° C. for 2 to 4 hours, then 115° to 125° C. for 1 to 2 hours, and finally from 125° to 145° C. for 1 to 4 hours.

The substantially completely polymerized beads, prepared in accordance with the method herein described, are separated from the suspension water by any of the conventional methods such as screening, sedimentation or centrifuging and then dried. It is also possible to extrude the polymer bead products to obtain pellets.

The invention will be more fully understood by reference to the following illustrative embodiment.

EXAMPLE

The general method employed for the preparation of the polymer beads of Runs 1 through 7 of Table A was as follows: Finely ground linear polybutadiene was dissolved in styrene, and the monomer solution was added to a vessel equipped with a stirrer. The vessel and its contents were thoroughly flushed with nitrogen, and a nitrogen blanket was maintained over the solution. The agitated solution was heated to a temperature of about 120° C. until the monomer was sufficiently polymerized to obtain a stable discrete rubber phase. To this was added a 20% solution of polyphenylene oxide polymer.

The aqueous suspension bath was prepared by dissolving hydroxyethyl cellulose having a viscosity in a 1% aqueous solution at 25° C. from about 1500 to 2500 cps. (Brookfield viscometer) in a reactor equipped with a stirrer.

The prepolymer admixed with the polyphenylene oxide polymer solution and initiators was added to the aqueous suspension at a moderate rate while the suspension was maintained under constant agitation. The reactor and its contents were flushed with nitrogen and the reactor was sealed and pressurized with 5–20 p.s.i. nitrogen. Polymerization was continued with agitation at a temperature cycle of 3 hours at 110° C., 1 hour at 120° C., 1 hour at 130° C., and 1 hour at 140° C. Upon completion of the polymerization, the mixture was cooled, the reactor opened, and the contents were filtered to isolate the beads. The beads were then washed with water and dried in a vacuum oven at 65° C.

The polyphenylene oxide polymer employed in each of the runs is poly-2,6-dimethyl-1,4-phenylene oxide having an intrinsic viscosity of 0.065 dl./g. determined at 25° C. It is also characterized by a brittle point of less than −275° F.; a heat deflection point of about 375° F. at 264 p.s.i. load; and a tensile modulus between 330,000 and 340,000 p.s.i. at 257° F.

TABLE

| Formulation | Runs | | | | | | |
|---|---|---|---|---|---|---|---|
| | 1 | 2 | 3 | 4 | 5 | 6 | 7 |
| Polyphenylene oxide polymer, percent [a] | 0 | 10 | 0 | 5 | 10 | 0 | 6.7 |
| Rubber, percent [b] | 4 | 4 | 6 | 6 | 6 | 8 | 8 |
| Styrene, percent | 94.6 | 83.6 | 92.6 | 87.6 | 82.6 | 90.6 | 83.9 |
| Mineral oil, percent | 1 | 1 | 1 | 1 | 1 | 1 | 1 |
| t-Dodecyl mercaptan, percent | 0.1 | 0.1 | 0.1 | 0.1 | 0.1 | 0.1 | 0.1 |
| Polygard, percent [c] | 0.1 | 0.1 | 0.1 | 0.1 | 0.1 | 0.1 | 0.1 |
| t-Butyl perbenzoate, percent | 0.15 | 0.15 | 0.15 | 0.15 | 0.15 | 0.15 | 0.15 |
| t-Butyl peroxide, percent | 0.05 | 0.05 | 0.05 | 0.05 | 0.05 | 0.05 | 0.05 |
| Styrene withheld [d] | 2/5 | 2/5 | 1/5 | 1/5 | 1/5 | 1/5 | 1/5 |
| Polymerization Conditions: | | | | | | | |
| Prepolym. temp., °C | 120 | 120 | 120 | 120 | 120 | 120 | 120 |
| Total solids, percent | 28.6 | 28.6 | 28.6 | 28.6 | 28.6 | 34.0 | 34.0 |
| Prepolym./water ratio | 1 | 1 | 1 | 1 | 1 | 1 | 1 |
| Hydroxethyl cellulose, percent (based on water) | 0.3 | 0.3 | 0.3 | 0.3 | 0.3 | 0.3 | 0.3 |
| Suspension polym. temp. cycle | (3 hrs. at 110° C.; 1 hr. at 120°C.; 1 hr. at 130° C.; and 1 hr. at 140° C.) | | | | | | |
| Physical Properties: | | | | | | | |
| Izod Impact [e] (ft.-lbs./in.) | 2 | 3 | 2.2 | 4.1 | 5.8 | 3.0 | 4.4 |
| Rockwell Hardness (L Scale) | 72 | 83 | 62 | 69 | 75 | 48 | 59 |
| Deflect temp., °C.[f] | 85 | 88.5 | 83 | 86 | 86 | 84 | 87 |
| Tensile yield, p.s.i. | | | | | | 3,500 | 4,000 |
| Tensile fail, p.s.i. | | | | | | 3,300 | 4,400 |
| Elongation at fail, percent | | | | | | 15 | 19 |
| Flexural strength, p.s.i. | | | | | | 5,300 | 6,300 |

[a] Poly-2,6-dimethyl-1,4-phenylene oxide.
[b] Linear polybutadiene having a 35% cis-1,4 content (Mooney Viscosity =55).
[c] Trisnonylphenyl phosphite (antioxidant).
[d] Proportion of styrene admixed with polyphenylene oxide polymer to form the above described solution.
[e] ASTM D-256-56.
[f] ASTM D-648-56.

The above data show that the graft polymers prepared from formulations containing polyphenylene oxide polymer have an improved Izod impact over those polymer products prepared from styrene and rubber alone. Super impact resistance, rubber-modified polymers were obtained from formulations containing 5 to 10% by weight polyphenylene oxide polymer. The Izod impact values in these cases were over 50% or greater than that obtained with rubber alone. The use of the polyphenylene oxide polymer also resulted in substantial improvements in the heat deflection temperature and Rockwell L Hardness values. The data also show that tensile and flexural properties as well as elongation properties were substantially improved.

In accordance with another aspect of the present invention, it has also been found that additional novel impact resistant, rubber-modified graft polymers can be prepared by admixing the styrene with a different monomer such as acrylonitrile. In general, the two monomers will be employed in a parts by weight ratio of styrene to acrylonitrile of about 20/80 to 80/20, and preferably about 35/65 to 75/25. Other monomers which can be substituted for a minor portion of the styrene include methacrylonitrile, methyl methacrylate, methacrylic acid, and the like. This aspect of the invention will concern the preparation of improved terpolymers or interpolymers prepared from styrene and acrylonitrile grafted onto a rubbery polymer, which are often referred to as ABS polymers. As discussed above, the improvements in the physical properties are accomplished by carrying out the second stage, or suspension polymerization step, in the presence of minor amounts of the polyphenylene oxide polymer in monomer solution.

In general, the two-stage bulk suspension polymerization process can be employed for the preparation of these modified ABS polymers. Thus, for example, to substantial amounts of styrene and acrylonitrile in a polymerization vessel equipped with a stirrer there is added preferably finely ground, monomer soluble rubbery polymer in the amounts set forth above. The acrylonitrile can be added to the styrene either prior to the addition of the rubber or afterwards, the addition of this component not being critical at any particular point prior to the prepolymerization reaction. It is also possible to employ minor amounts of one or more of the conventional additives to the prepolymerization reaction mixture. After the addition of the acrylonitrile to the styrene and the dissolution of the rubbery polymer, polymerization in bulk is carried out utilizing a peroxide initiator of the foregoing type. Again the polymerization can be effected in the absence of an initiator under strictly thermal conditions, which is the preferred method. All of the previously described prepolymerization conditions as well as the polymerization conditions and therein are applicable here.

What is claimed is:

1. In a graft polymerization process for preparing a diolefin rubber-modified polymer which comprises prepolymerizing a feed mixture comprising a monovinyl aromatic compound and a diolefin rubber with agitation in a first step, suspending the resulting prepolymerization reaction product mixture from said first step in an aqueous medium in a second step and then polymerizing said suspended prepolymerization product mixture in said second step, the improvement which comprises:

(a) adding to said prepolymerization product mixtures 2 to 20%, by weight based on total weight of the polymer product, of a polyphenylene oxide polymer, which polymer has the following structural formula:

wherein AR is a divalent aryl radical and $n$ is an integer from 10 to 1,000 or higher, after said feed mixture of monovinyl aromatic compound and rubber diolefin has been heated to a temperature in the range of about 110° to 130° C. for a period sufficient to polymerize from about 10 to 45% of said monovinyl aromatic compound, (b) substantially completing the suspension polymerization in the presence of said polyphenylene oxide polymer, and (c) recovering the diolefin rubber-modified polymer from said second step.

2. The process of claim 1 wherein said monovinyl aromatic compound is styrene.

3. The process of claim 1 wherein said feed mixture also contains acrylonitrile.

4. The process of claim 1 wherein said rubber is linear polybutadiene having a cis-1,4 content of at least 30%.

5. The process of claim 1 wherein the amount of polyphenylene oxide polymer ranges from about 2 to 10% by weight based on the total weight of the polymer product.

6. The process of claim 1 wherein said polyphenylene oxide is poly-2,6-dimethyl-1,4-phenylene oxide.

7. In a graft polymerization process for preparing a high impact resistant, diolefin rubber-modified polystyrene polymer which comprises prepolymerizing a feed mixture comprising styrene and 2–25% by weight, based on the total weight of the styrene, of linear polybutadiene having a cis-1,4 content of at least 30% with agitation in a first step, suspending the resulting prepolymerization reaction product mixture from said first step in an aqueous medium in a second step and then polymerizing said suspended prepolymerization product mixture in said second step to obtain a high level of conversion to polymeric material, the improvement which comprises:

(a) adding to said prepolymerization product mixture 2 to 20%, by weight, based on the total weight of the polymer product, of a polyphenylene oxide polymer, which polymer has the following structural formula:

wherein AR is a divalent aryl radical and $n$ is an integer from 10 to 1,000 or higher, after said feed mixture of styrene and said linear polybutadiene has been heated to a temperature in the range of about 110° to 130° C. for a period sufficient to polymerize from about 10 to 45% of said styrene, (b) substantially completing the suspension polymerization in the presence of said polyphenylene oxide polymer, and (c) recovering said high impact resistant, diolefin rubber-modified polystyrene polymer from the said second step.

8. The process of claim 7 wherein said feed mixture contains acrylonitrile in a styrene to acrylonitrile ratio within the range of about 20/80 to 80/20.

9. The process of claim 7 wherein said polyphenylene oxide polymer is poly-2,6-dimethyl-1,4-phenylene oxide.

10. The process of claim 7 wherein the amount of said polyphenylene oxide polymer ranges from about 2 to 10% by weight based on the total weight of the polymer product.

11. A rubber-modified vinyl aromatic polymer prepared in accordance with the process of claim 1 and having improved physical properties.

12. A rubber-modified polystyrene polymer prepared in accordance with the process of claim 7 and having improved physical properties.

13. A rubber-modified polymer prepared from mixtures of styrene and acrylonitrile prepared in accordance with the process of claim 8 and having improved physical properties.

References Cited

UNITED STATES PATENTS

| | | | |
|---|---|---|---|
| 3,267,178 | 8/1966 | Lee | 260—880 |
| 3,373,226 | 3/1968 | Gowan | 260—874 |
| 3,383,435 | 5/1968 | Cizek | 260—893 XR |
| 3,384,682 | 5/1968 | Erchak et al. | 260—874 |

MURRAY TILLMAN, Primary Examiner

K. E. KUFFNER, Assistant Examiner

U.S. Cl. X.R.

260—47, 880